No. 812,556. PATENTED FEB. 13, 1906.
W. FETZER.
TRANSPLANTER.
APPLICATION FILED SEPT. 8, 1905.

2 SHEETS—SHEET 2.

Witnesses:
Jas. E. Hutchinson.
Thos. R. Heath

Inventor
William Fetzer,
By T. Dacre Milam Attorneys.

UNITED STATES PATENT OFFICE.

WILLIAM FETZER, OF MIDDLETOWN, OHIO.

TRANSPLANTER.

No. 812,556.     Specification of Letters Patent.     Patented Feb. 13, 1906.

Application filed September 8, 1905. Serial No. 277,479.

*To all whom it may concern:*

Be it known that I, WILLIAM FETZER, a citizen of the United States, residing at Middletown, in the county of Butler and State of Ohio, have invented certain new and useful Improvements in Transplanters, of which the following is a specification, reference being had therein to the accompanying drawings.

This invention relates to an improvement in transplanters, and more particularly to that type of transplanter with which it is desired to combine a fertilizer-distributer for the purpose of fertilizing the soil preparatory to depositing a plant therein.

The object of the invention is the provision of means for forming, in advance of the furrow-opener, a groove in the ground, into which the fertilizer is adapted to be discharged, whereby scattering of the same may be prevented and whereby when the furrow-opener acts upon the groove to form the furrow the fertilizer will be positioned to properly surround the plant when the same is deposited within the furrow.

A further object of the invention is the provision of means positioned in advance of the furrow-opener for breaking through the crust of hard earth and preparing the ground so that an even furrow will be made when the same is acted on by the furrow-opener.

A further object is the provision of means whereby the transplanter may be caused to travel in a straight line and means whereby the same may be used upon a side hill without slipping or sliding.

Other objects of the invention will be apparent from the detailed description hereinafter when read in connection with the accompanying drawings, forming a part hereof, wherein like letters of reference refer to similar parts and wherein a preferable embodiment of my invention is shown.

Figure 1:
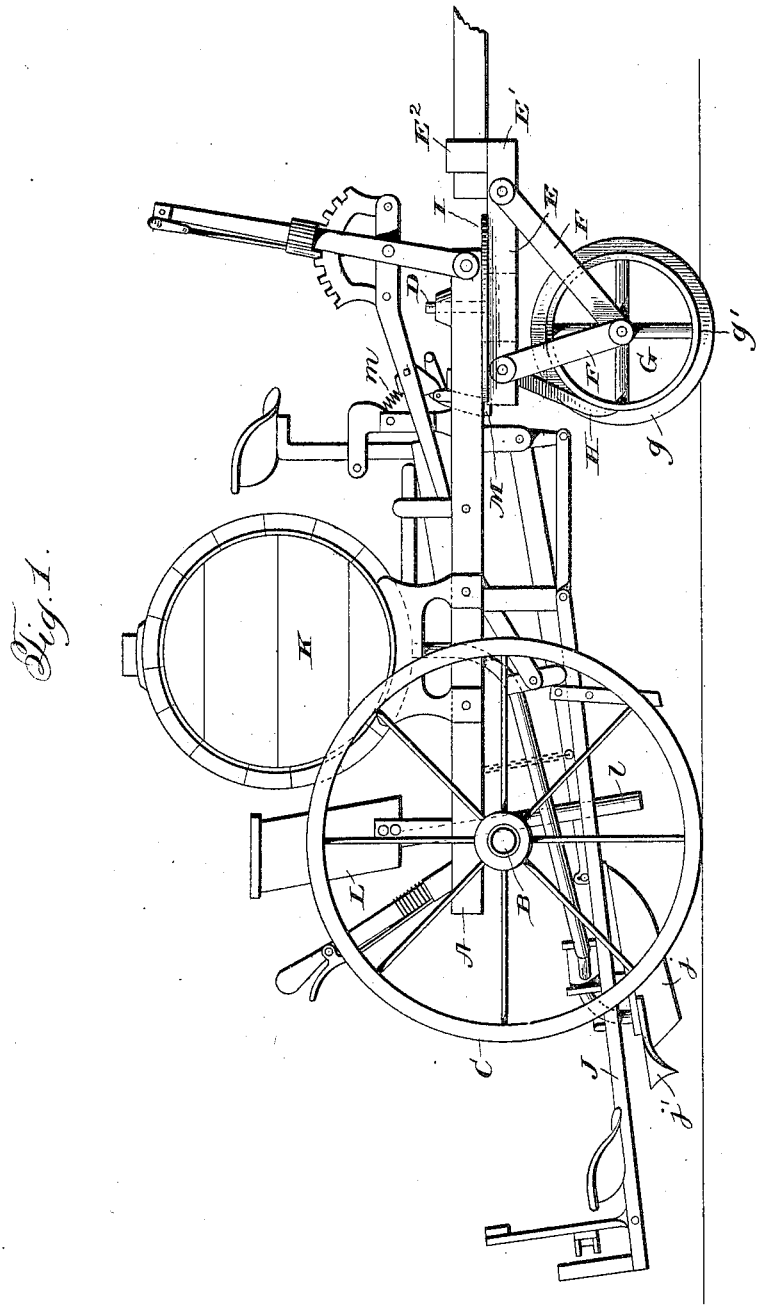
Figure 2:
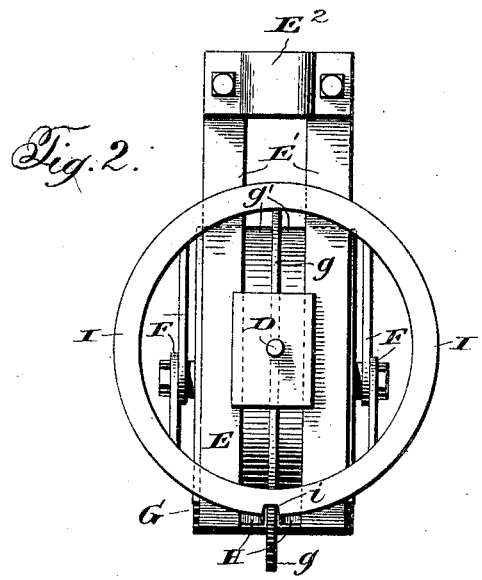
Figure 3:
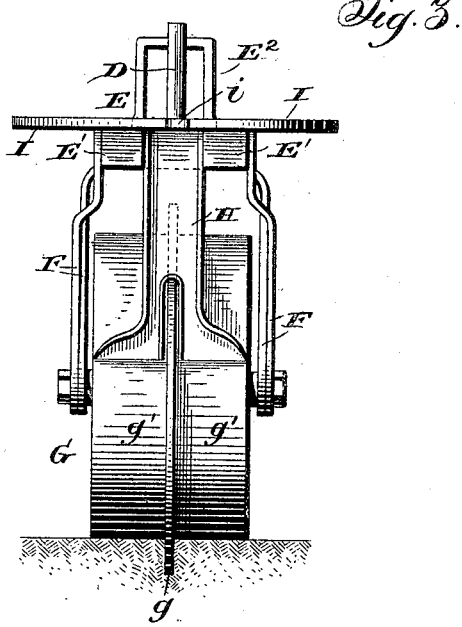

In the drawings, Figure 1 is a side elevation of my improved transplanter and fertilizer-distributer. Fig. 2 is a plan view of the caster-wheel frame. and Fig. 3 is a rear elevation of the same.

Referring now more particularly to the drawings, A designates the main frame of the machine, which is of a substantially triangular formation and in the rear portion of which is journaled the axle B, upon the ends of which are secured in any suitable manner the supporting-wheels C. Pivotally secured to the under side of the forward portion of the main frame by means of a bolt D, which extends upwardly therefrom and engages a suitable aperture in said main frame, is a supplemental frame E. The frame E comprises a pair of short parallel beams E', between which is secured in any suitable manner a block which supports the upwardly-extending pin D, hereinbefore referred to. The beams E' and said block are rigidly connected in any suitable manner.

F F designate downwardly-extending hangers, which are secured in any suitable manner to the beams E' and in the lower ends of which is journaled the caster-wheel G. The caster-wheel G is provided with a centrally-disposed flanged portion $g$ and with wide flat bearing-surfaces $g'$ at each side thereof, for a purpose to be hereinafter more particularly set forth.

H designates a scraper secured in any suitable manner between the beams E', the outer end of which is adapted to stand in close relation to the flat bearing portions $g'$ of the caster-wheel G, the central portion of said scraper being provided with a slot to permit the passage therethrough of the flange of the caster-wheel.

Secured to the upper side of the beams E' is a flat circular ring I, which contacts with the under side of the beams of the main frame of the machine and forms a bearing for the caster-wheel to turn on. The rear portion of the plate I is provided with an inwardly-extending notch $i$, for a purpose to be hereinafter more particularly set forth. The forward portion of the frame E is provided with a suitable clevis $E^2$, to which a tongue or other draft device may be connected.

Pivotally secured in any suitable manner to the main frame are the drag-bars J, to the rear ends of which are secured the furrow-opener $j$ and the covering-plates $j'$, which may be of any suitable construction.

K designates a water-receptacle secured in any suitable manner to the main frame and from which a pipe or hose extends rearwardly to a position just behind the furrow-opener $j$. The discharge of the water through the pipe may be effected in any suitable manner. The construction of the water-tank, the discharge-pipe leading therefrom, the drag-bars, the furrow-opener and the covering-plates carried thereby, and the means for regulating the pressure on the furrow-opener form no part of the present invention and will not, therefore, be described in detail herein. For the purposes of illustration, however, I have shown these parts as being of the same construction as the similar parts in Patent No. 653,425, granted July 10, 1900, to C. Moehring.

Secured in any suitable manner to the main frame of the machine is a fertilizer-distributer L, the discharge-spout $l$ of which extends downwardly to a position in advance of the furrow-opener $j$ and directly in rear of the flanged portion $g$ of the caster-wheel G. The feed mechanism of the fertilizer-distributer may be of any suitable construction, as it forms no part of the present invention and may be driven in any suitable manner from the axle B.

It is desirable when using the transplanter that the supplemental frame E be locked to the main frame of the machine, so as to hold the caster-wheel in a position parallel with the supporting-wheels C, so that the machine will travel in a straight line. To effect this, I pivotally secure to the front portion of the main frame A a dog M, which is normally held in engagement with the inwardly-extending notch in the plate I on the supplemental frame E by a spring $m$. When it is desired to turn the machine, the dog M may be disengaged by the operator from the notch $i$ in the plate I. Any suitable means may be employed for disengaging the dog; but for the purposes of illustration I have shown the same means as is illustrated in the patent hereinbefore referred to.

Having described the construction of my improved machine, I will now set forth the operation of the same. The supplemental frame E is first locked to the main frame A. When the machine is then drawn along, the flanged portion of the caster-wheel G will form a groove in the ground into which the discharge-spout $l$ of the fertilizer-distributer will deposit the fertilizer, while the flat bearing portions $g'$ will break through the crust of trash and shell of hard earth and prepare the ground, so that when acted upon by the furrow-opener $j$ a smooth furrow will be the result, as distinguished from the ragged furrows which are made when the furrow-opener is caused to act directly upon the rough and uneven ground. By forming a groove in the ground into which the fertilizer is distributed a great saving of fertilizer material is obtained, as there is no scattering of the material as is the case when the same is deposited directly upon the ground, and, furthermore, by depositing the fertilizer material in the groove the same is confined to the ground immediately surrounding the plant when the groove is further opened up by the furrow-opener.

It will be obvious that by providing the transplanter with a flanged caster-wheel a very effective machine is obtained for work on side hills, as all side slipping of the machine is thereby prevented. It will also be obvious that when the caster-wheel is locked against movement, the flanged portion thereof being embedded in the ground will serve to cause the machine to travel in a perfectly-straight line.

I do not desire to limit myself to the precise form and construction shown in the drawings, as it is obvious that many minor changes might be made thereto without departing from the spirit of the invention.

What I claim as my invention, and desire to secure by Letters Patent, is—

1. In combination, a furrow-opener, and means positioned in advance of the furrow-opener for forming a groove in the ground and packing the earth at each side thereof to facilitate the formation of the furrow.

2. In combination, a furrow-opener and a flanged wheel positioned in advance of said furrow-opener.

3. In combination, a furrow-opener, and a flanged caster-wheel positioned in advance of said furrow-opener.

4. In combination, a furrow-opener, and a wheel positioned in advance thereof, said wheel having a centrally-disposed flange and flat bearing-surfaces at each side thereof.

5. In combination, a furrow-opener, means positioned in advance of the furrow-opener for forming a groove in the ground, and a fertilizer-distributer arranged to discharge into said groove.

6. In combination, a furrow-opener, a flanged wheel positioned in advance of the furrow-opener, and a fertilizer-distributer positioned in advance of the furrow-opener and arranged to discharge into the groove formed by the flanged wheel.

7. In combination, a furrow-opener, a wheel arranged in advance of said furrow-opener, said wheel being provided with a centrally-disposed flange and flat bearing-surfaces at each side thereof, and a fertilizer-distributer adapted to discharge into the groove formed by the flange of said wheel.

8. In combination, a furrow-opener, a flanged caster-wheel positioned in advance of said furrow-opener, and a fertilizer-distributer adapted to discharge into the groove formed by the flanged caster-wheel.

9. In combination, a furrow-opener, means positioned in advance of said furrow-opener for forming a groove in the ground, a fertilizer-distributer adapted to discharge into said groove, and covering means positioned in rear of said furrow-opener.

10. In combination, a furrow-opener, a flanged wheel positioned in advance of said furrow-opener, a fertilizer-distributer adapted to discharge into the groove formed by the flanged wheel, and covering-plates positioned in rear of said furrow-opener.

In testimony whereof I affix my signature in presence of two witnesses.

WILLIAM FETZER.

Witnesses:
    FLOYD CLISE,
    G. A. SULLIVAN.